Feb. 26, 1963

C. F. PETKWITZ 3,078,688

REFRIGERATION

Filed Dec. 6, 1961

INVENTOR.
Carl F. Petkwitz
BY
Lloyd M. Keighley
HIS ATTORNEY

Feb. 26, 1963   C. F. PETKWITZ   3,078,688
REFRIGERATION
Filed Dec. 6, 1961   2 Sheets-Sheet 2

INVENTOR.
Carl F. Petkwitz
BY
Lloyd M. Keighley
HIS ATTORNEY

United States Patent Office 3,078,688
Patented Feb. 26, 1963

3,078,688
REFRIGERATION
Carl F. Petkwitz, Dayton, Ohio, assignor to General Motors Corporation, Detroit, Mich., a corporation of Delaware
Filed Dec. 6, 1961, Ser. No. 157,481
2 Claims. (Cl. 62—159)

This invention relates to transition of food products within a household refrigerator cabinet so as to condition certain foods therein for cooking immediately upon removal thereof from the refrigerator.

Modern household refrigerator cabinets have both an unfrozen food storage chamber, normally maintained between 37° and 42° F., and another freezing or frozen food storage chamber therein, normally maintained at a temperature of from 12° to 20° F. The temperature differential between these chambers is not great enough to create thawing of frozen food products removed from the freezing or frozen food storage chamber and placed into the unfrozen food storage chamber with a rapidity satisfactory to the menu planning of some users of such refrigerators. For example, a housewife, upon determining in advance the type of meat to be cooked for a subsequent meal, is confronted with the problem of storing frozen poultry, fish, a large cut of beef, a steak, or a batch of hamburger removed from the below freezing temperature chamber of the refrigerator in a place or zone to effect thorough thawing thereof and yet prevent its spoilage prior to preparing same for cooking. This has instigated some housewives to remove frozen food products from the freezing chamber of a refrigerator cabinet and place the frozen food in the kitchen sink for thawing and drainage thereof therein. Such act, while frequently performed, is nevertheless a hazardous one and if warming of frozen fish, meats and other fat containing foods to thaw them in this fashion is forgotten or delayed too long, particularly during hot weather, it causes the thawed food to become tainted or spoiled necessitating destruction thereof thus resulting in a wasteful expensive experience. It is therefore evident that modern household refrigerators with all their advantages and conveniences are needful of some means to facilitate transition and thawing of frozen foods therein whereby the food after being thawed will be maintained within walls of the refrigerator at a temperature to prevent spoilage thereof.

An object of my invention is to provide an improved household refrigerator wherein transition of frozen foods and storage thereof after being thawed will be at a temperature to prevent spoilage of the food.

Another object of my invention is to provide a refrigerator cabinet with a controlled temperature compartment for the reception of frozen foods from a freezing chamber in the cabinet to be thawed in anticipation of preparing same for cooking and in which compartment the food is stored at a preserving temperature prior to its being cooked.

A further object of my invention is to provide in a refrigerator cabinet a frozen food receiving and thawing compartment having a drainage arrangement associated therewith for disposing of condensate water from the food being thawed to prevent contamination thereof by impurities in the water.

In carrying out the foregoing objects it is a still further and more specific object of my invention to provide a household refrigerator cabinet having several separate and differently refrigerator food storage chambers with an additional or auxiliary compartment of substantial size therein for the reception of frozen food from one of the chambers, which food as received in the compartment automatically causes a temporary increase in the temperature therein to thaw the food and upon being thawed then causes the temperature in the compartment to again be automatically decreased to a point intermediate the temperature of the highest temperatured chamber in the cabinet and temperatures ambient the refrigerator whereby the thawed food will thereafter be preserved in the compartment by partial exposure of walls thereof to chilled air within a chamber of the cabinet.

Further objects and advantages of the present invention will be apparent from the following description, reference being had to the accompanying drawings wherein a preferred embodiment of the present invention is clearly shown.

Figure 2:
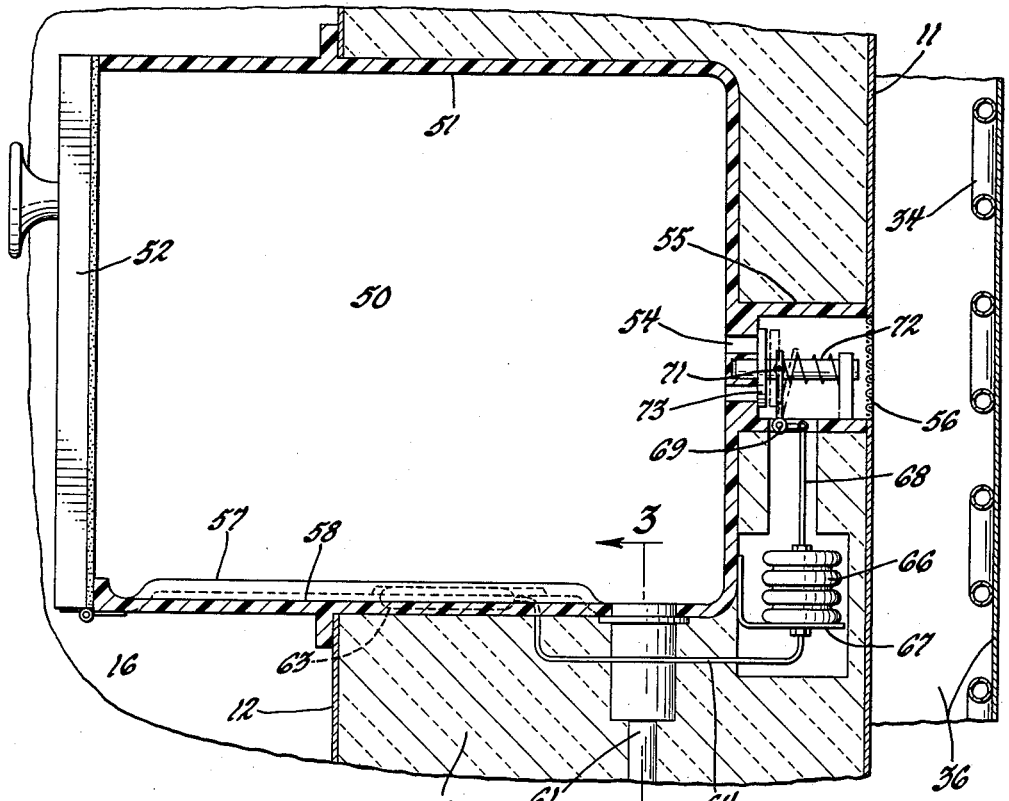
FIGURE 2 is an enlarged fragmentary sectional view taken on the line 2—2 of FIGURE 1 showing the frozen food thawing compartment of my invention.
Figure 1:
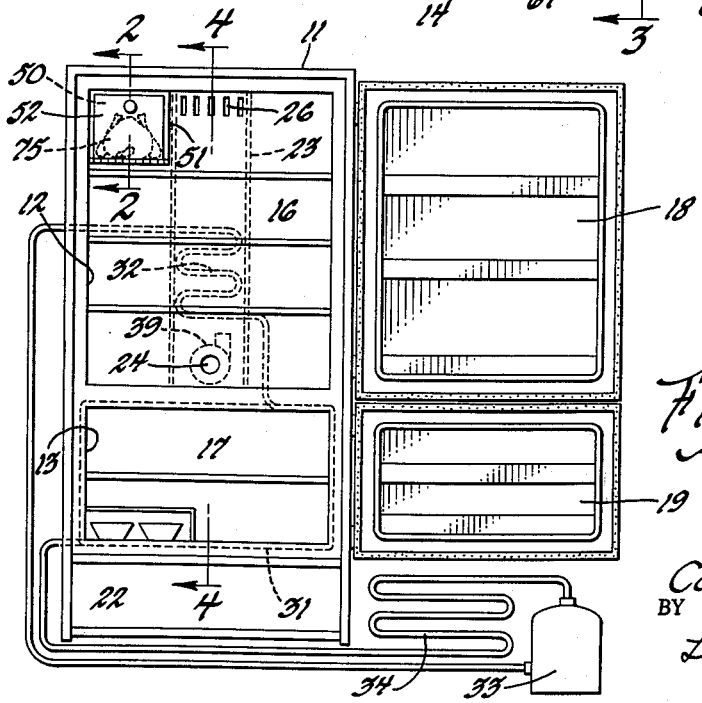
FIGURE 1 is a front view of a household refrigerator cabinet showing doors to chambers therein open with a compartment of the present invention in one of the chambers and diagrammatically illustrating a refrigerating system associated with the cabinet.
Figure 4:
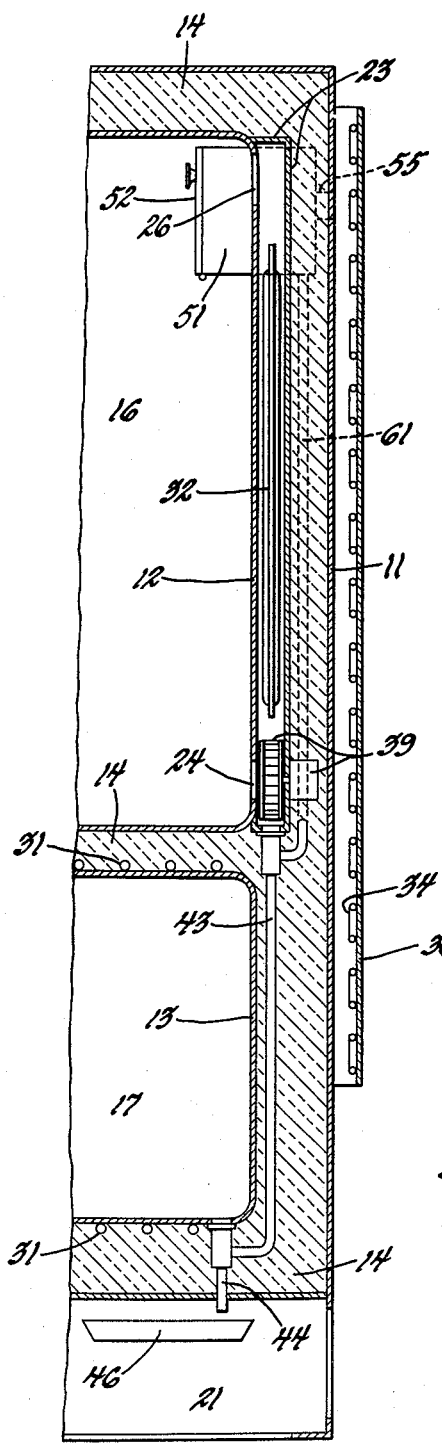
Figure 3:
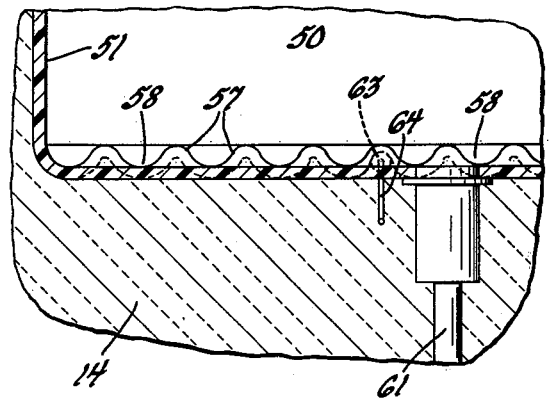

FIGURE 3 is a fragmentary sectional view taken on the line 3—3 of FIGURE 2 illustrating the corrugated bottom of the thawing compartment and a drain conduit leading therefrom; and FIGURE 4 is an enlarged fragmentary vertical sectional view through the refrigerator cabinet taken on the line 4—4 of FIGURE 1 showing the drain conduit leading from the frozen food thawing compartment connected to a drain pipe in the refrigerator cabinet.

Referring to the drawings, for illustrating my invention, I show in FIGURE 1, thereof a two-temperature multiple-chambered household refrigerator cabinet including outer metal panels or walls 11 and separate inner metal box-like liners or walls 12 and 13 spaced from walls 11 and having any suitable or desirable insulating material 14 (see FIGURE 4) d'sposed therebetween. The insulated cabinet walls define or form an upper or first unfrozen food storage chamber 16 and a lower or second freezing or frozen food storage chamber 17 each provided with individual doors 18 and 19 respectively. These chambers 16 and 17 are separate and insulated from one another by the insulation 14 and doors 18 and 19 normally seal against the front of the refrigerator cabinet to close the chambers. Outer walls 11 of the cabinet extend downwardly beyond food storage chamber 17 to provide a machine compartment 21 (see FIGURE 4) in the lower part of the refrigerator cabinet closed at its front by panel 22. An air passageway formed in back of liner 12 by walls indicated at 23 is provided with an inlet opening 24 and air outlet openings 26 (see FIGURES 1 and 4) both communicating with the interior of food storage chamber 16. A refrigerating system associated with the refrigerator cabinet includes refrigerant evaporating means in the form of a first evaporator 31 which is a conduit coiled or wrapped around and secured in metal-to-metal contact to the outer surface of liner 13 and a second evaporator 32, which may be a pressure forged or welded sheet metal structure disposed or mounted in the air passageway behind the rear wall or liner 12 of the upper unfrozen food chamber 16. The evaporators 31 and 32 are connected to one another and to a refrigerant translating mechanism including a casing 33, housing a refrigerant compressor and an electric motor for operating the compressor, and a refrigerant condenser 34 all connected together by suitable pipes or conduits as is conventional in the art. Casing 33 is preferably located within machine compartment 21 behind front panel 22 thereof and the refrigerant condenser 34 is preferably mounted on a metal flue forming member 36 secured to the back wall of the refrigerator cabinet. A combined electric motor and blower unit indicated at 39 is utilized to circulate air to and from chamber 16 through the air passageway, formed by walls 23, and over evaporator 32 where the air is chilled and circulated by way of the inlet and outlet 24 and 26 respectively from the chamber 16 and back thereinto. Any suitable or conventional controls may be provided for starting and stopping the motor in casing 33 to drive the refrigerant compressor therein and for causing operation of the motor-blower unit 39. Such controls are normally set to cause evaporator 31 to refrigerate the interior of freezing or frozen food storage chamber 17 at a temperature of from 12° to 20° F. and to cause evaporator 32 to chill air circulated through the unfrozen food storage chamber 16 to a temperature to maintain the interior of this chamber between 37° and 42° F. The refrigerator cabinet is provided with means to conduct condensate or defrost water out of the chambers 16 and 17 when the refrigerating system is rendered inoperative for causing defrosting of evaporator 32 and defrosting of the interior of frozen food storage chamber 17. This means includes a drain pipe 43 extending downwardly from the bottom of walls 23 of the air passageway behind chamber 16 and connected to another drain pipe 44 extending downwardly from the bottom of chamber 17 (see FIGURE 4) into the machine compartment 21. The lower end of pipe 44 is disposed above a pan 46, suitably mounted in machine compartment 21, for discharging water thereinto which water is heated and vaporized out of the pan, in any suitable or now conventional manner, to air ambient the refrigerator cabinet.

As hereinbefore stated, a hazardous inconvenience exists in the use of household refrigerators of the type described and in the handling of frozen foods in conjunction therewith. This inconvenience lies in the transition of frozen foods removed from the freezing chamber of the refrigerator to thaw, condition and prevent spoilage of such foods prior to preparing them for cooking. In accordance with my invention I contemplate the elimination of such hazardous inconvenience. In the present disclosure I provide a compartment within the confine of the walls of the refrigerator cabinet of such size as to receive from the freezing chamber in the refrigerator a large frozen piece of meat such as a roast or the like and frozen fish or poultry products such as a chicken or duck to be thawed and thereafter safely stored prior to preparing same for cooking. A compartment 50 preferably formed by molded plastic walls 51 has an opening, normally closed by a hingedly mounted door 52, accessible from within the unfrozen food storage chamber 16 when its door 18 is opened. Some or portions of walls 51 of compartment 50 are exposed to chilled air interiorly of chamber 16 while other portions of the compartment walls are embedded in the insulation 14 within the rear wall of the refrigerator cabinet (see FIGURE 2). The back wall of compartment 50 has openings 54 therein and this wall is provided with an integral hollow collar-like extension 55 which abuts against bounding portions of an aperture in the outer cabinet rear wall 11 closed by a screen 56. The bottom wall of compartment 50 is preferably inclined downwardly toward the rear of the compartment and is corrugated or provided with raised ridges 57 and valleys or furrows 58 therebetween (see FIGURE 3). A conduit 61 communicating with compartment 50 leads therefrom and is connected to drain pipe 43. Means is provided for controlling the openings 54 in the rear wall of compartment 50 to vent the compartment to air ambient the refrigerator cabinet and this means is utilized to increase the interior temperature of the compartment for a purpose to be presently described. The control or temperature increasing means for compartment 50 comprises a thermostatic device including a bulb 63 mounted in any suitable or desirable manner to the exterior surface of the bottom wall of the compartment and connected, by a conduit 64, to a bellows 66 secured to a bracket 67. Bulb 63, conduit 64 and bellows 66 are charged with or have sealed therein a temperature responsive expansible and contractible fluid to form the thermostatic device. The movable end of bellows 66 is connected to a rod 68 attached to one end of a bell crank lever pivotally mounted or fulcrumed as at 69. The other end of this lever is attached, as by a pin or the like 71, to a spring pressed stem 72 of a slidably mounted valve 73 which normally closes the openings 54 in the back wall of compartment 50. By virtue of venting the interior of compartment 50 by a thermostatic device and by virtue of the partial exposure of walls of the compartment to chilled air within the unfrozen food storage chamber 16, compartment 50 is temperature controlled between predetermined limits in a unique manner as will become apparent hereinafter.

Assume that the refrigerator is functioning in the usual fashion to chill air in the unfrozen food storage chamber 16 therein between 37° and 42° F. and to maintain the interior of freezing or frozen food storage chamber 17 at a temperature from 12° to 20° F. and a housewife anticipates the preparation of a frozen food product stored in the low temperature chamber 17 for a subsequent meal. The frozen food product, whether it be a large cut of beef, a package of fish, a batch of hamburger, or a chicken, indicated at 75 in FIGURE 1 of the drawings, is removed from freezing chamber 17 and placed in compartment 50. It is to be understood that, regardless of humidity conditions within the low temperature chamber 17, the mere act of removing the frozen product therefrom and its temporary exposure to air ambient the refrigerator during transition of the product to compartment 50 at a temperature between 12° and 20° F. will cause a rapid accummulation or condensation of moisture, from the atmosphere exteriorly of the refrigerator cabinet, on the product in the form of frost. Thus the disposition of the frozen product into compartment 50 makes it desirable to drain water of condensation from the product out of the compartment without further ado. Having placed chicken 75 within compartment 50 and closing doors 52 and 18 the chicken is confined in the compartment out of communication with chilled air in chamber 16 and it is at a sufficient low temperature to be sensed by the relatively higher temperature bulb 63. The low temperature of the frozen chicken causes fluid in the thermostatic device to contract bellows 66 and move rod 68 downwardly. Movement of rod 68 shifts the bell crank lever about its fulcrum 69 to actuate valve 73 out of engagement with the back wall of compartment 50 to uncover the openings 54 therein. The interior of compartment 50 is now vented to heat ambient the refrigerator cabinet, particularly to heat of condenser 34 of the refrigerating system associated with the refrigerator, and the means is rendered effective automatically in response to disposition of frozen chicken 75 into the compartment 50 for increasing the temperature therein. As the temperature within compartment 50 rises above 32° F. the frozen chicken 75 thaws uniformly throughout the entire body thereof. Condensate water resulting from thawing of chicken 75 while supported on ridges 57 in the bottom wall of compartment 50 flows through the valleys 58 therein to conduit 61 whereupon this conduit conducts the water out of compartment 50 into the drain pipes 43 and 44 beyond insulation 14 in the refrigerator cabinet and into pan 46 to be vaporized therefrom. The present arrangement of partial exposure of walls 51 of compartment 50 to chill air in chamber 16 and the isolated higher temperature location of bulb 63 contributes to rendering the thermostatic device responsive to a thawed condition of chicken 75 to automatically actuate valve 73 into a position to close the compartment vent openings 54 whereby the thawed chicken is thereafter stored in the thawing compartment at approximately 50° F. Chicken 75 is thereby stored within walls of the refrigerator cabinet at such a temperature as to prevent spoilage thereof until such time as it is removed from the thawing compartment 50 and cut up or prepared to be cooked. While I have exemplified a frozen chicken as being thawed in compartment 50 it is to be understood that this compartment may be employed in thawing any frozen foods such as fish, beef, pork, canned soups and canned fruit juices. Compartment 50 is primarily a frozen food thawing zone within the refrigerator cabinet, as distinguished from a vegetable hydrator zone but it can when not used for this purpose also be employed for the storage therein of food products which do not necessitate too much refrigeration such, for example, as lard and other similar shortening or basting items so as to increase the utility of the compartment and not waste valuable storage space in the refrigerator cabinet. In the present disclosure I show a thermostatic device responsive to the below 32° F. temperature of frozen foods placed in compartment 50 to initiate thawing thereof and to a thawed temperature of the food above 32° F. for thereafter preserving and preventing its spoilage. However, a timer or chronometric device may, without departing from the realm of my invention, be employed to automatically control the temperature within compartment 50 for insuring complete thawing of frozen food products placed in the compartment uniformly throughout the entire body thereof.

It should, from the foregoing, be apparent that my unique combination provides an improved household refrigerating apparatus which facilitates transition and conditioning of frozen foods therein without danger, after the transitioning act has been performed, of thawed food becoming tainted or spoiled by its continued exposure to an increased or warming temperature. My invention provides a safe and economical frozen food transition, thawing and draining system or arrangement in conjunction with a household refrigerator cabinet which assures preservation of the thawed food over a period of time to thereby permit a housewife, if obliged, to alter or make unexpected last minute changes in a menu for a subsequent meal to be prepared. By my arrangement former hazardous means of thawing frozen foods in order to ready them for separation and preparation to be cooked is eliminated and the arrangement therefore fulfills a long sought need in the refrigeration art.

While the embodiment of the present invention as herein disclosed constitutes a preferred form, it is to be understood that other forms might be adopted.

What is claimed is as follows:

1. In combination:
   (a) a refrigerator cabinet provided with a first insulated food storage chamber and a second insulated chamber therein separate from said first chamber,
   (b) a refrigerating system associated with said cabinet including a refrigerant translating mechanism and evaporating means connected in closed refrigerant circulating relationship with one another,
   (c) said refrigerant evaporating means chilling air in said first chamber to a temperature above 32° F. and cooling said second chamber to a temperature well below 32° F. for the storage of frozen foods therein,
   (d) walls forming a compartment within said cabinet of a size capable of receiving frozen food removed from said second chamber,
   (e) certain walls of the compartment being disposed in the chilled air within said first chamber,
   (f) said walls normally closing said compartment to confine frozen food removed from the second chamber and placed therein out of communication with chilled air in said above 32° F. first chamber,
   (g) a drain conduit leading from said compartment beyond said insulated chambers,
   (h) said disposition of said certain walls of the compartment cooling the interior of said compartment to a temperature intermediate the temperature within said first chamber and temperatures ambient said cabinet for thawing frozen food confined in the compartment,
   (i) the bottom wall of said compartment being provided with raised portions supporting the frozen food thereabove whereby the lower part of said food is exposed at a plurality of spaced-apart points therealong to said intermediate compartment temperature for thawing said food uniformly throughout the entire body thereof, and
   (j) said compartment bottom wall directing condensate water flowing from the food as a result of thawing same to said drain conduit.

2. In combination:
   (a) a refrigerator cabinet provided with a first insulated food storage chamber and a second insulated chamber therein separate from said first chamber.
   (b) a refrigerating system associated with said cabinet including a refrigerant translating mechanism and refrigerant evaporating means connected in closed refrigerant circulating relationship with one another,
   (c) said refrigerant evaporating means chilling air in said first chamber to a temperature above 32° F. and cooling said second chamber to a temperature well below 32° F. for the storage of frozen foods therein,
   (d) walls forming a compartment within said cabinet at least some of which walls are exposed to the chilled air in said first food storage chamber for normally cooling the interior of said compartment to a predetermined temperature intermediate the temperature within the first chamber and temperatures ambient said cabinet,
   (e) said compartment being adapted to receive frozen food from said second below 32° F. temperatured chamber,
   (f) a drain conduit leading from said compartment beyond the insulation in said cabinet,
   (g) said walls closing said compartment to confine frozen food removed from said second chamber and placed in the compartment out of communication with chilled air in said first food storage chamber,
   (h) means for warming frozen food received and confined in said compartment to a temperature above said normal predetermined intermediate temperature therein for thawing said frozen food,
   (i) said warming means being rendered effective automatically in response to placing the frozen food into said compartment and rendered ineffective automatically in response to a thawed condition thereof whereby the thawed food is thereafter stored within the refrigerator cabinet, refrigerated and preserved in the compartment therein at said normal predetermined intermediate temperature.
   (j) the bottom wall of said compartment being provided with raised portions supporting the frozen food at a plurality of spaced-apart points thereabove to expose the lowermost part of the food to said warming means for thawing said food uniformly throughout its entire body, and
   (k) said compartment bottom wall directing condensate water flowing from the food as a result of thawing same to said drain conduit.

References Cited in the file of this patent

UNITED STATES PATENTS

| | | |
|---|---|---|
| 2,187,274 | Loveless | Jan. 16, 1940 |
| 2,238,635 | Fletcher | Apr. 15, 1941 |
| 2,311,446 | Knight | Feb. 16, 1943 |
| 2,363,375 | Wild | Nov. 21, 1944 |
| 2,912,834 | Mann | Nov. 17, 1959 |
| 3,021,688 | Wingfield | Feb. 20, 1962 |